United States Patent [19]

Lerner et al.

[11] Patent Number: 4,589,165
[45] Date of Patent: May 20, 1986

[54] APPARATUS AND METHOD FOR CUTTING SLAUGHTERED POULTRY INTO SEPARATE PIECES

[75] Inventors: Hershey Lerner, Hudson; William M. Easter, Solon; Rick S. Wehrmann, Hudson, all of Ohio

[73] Assignee: Automated Packaging Systems, Inc., Twinsburg, Ohio

[21] Appl. No.: 688,911

[22] Filed: Jan. 4, 1985

[51] Int. Cl.$^4$ ............................................. A22C 21/00
[52] U.S. Cl. ......................................... 17/11; 17/54; 74/586; 83/368; 83/504
[58] Field of Search .............. 17/1 G, 11, 54; 74/104, 74/110, 586; 83/368, 504, 508.2, 508.3; 493/367, 370

[56] References Cited

U.S. PATENT DOCUMENTS

| 4,019,223 | 4/1977 | Baker | 17/11 |
| 4,077,448 | 3/1978 | Hasenwinkle et al. | 83/368 |
| 4,083,083 | 4/1978 | Duncan et al. | 17/11 |
| 4,239,072 | 12/1980 | Merilainen | 83/368 |
| 4,406,037 | 9/1983 | Hazenbroek | 17/11 |
| 4,407,046 | 10/1983 | Wright | 17/11 |

*Primary Examiner*—John Sipos
*Assistant Examiner*—Donald R. Studebaker

*Attorney, Agent, or Firm*—Watts, Hoffmann, Fisher & Heinke Co.

[57] ABSTRACT

Apparatus for cutting slaughtered poultry into individual pieces including a keel cutting station for severing a front breast section from the carcass. The station includes a first cutter for cutting a rear portion of the keel and a second, reciprocating cutter for effecting a second cut that intersects a cut made by the first cutter such that the keel is completely severed from the carcass. The movement of the second cutter is coordinated with the movement of a carcass supporting module so that the reciprocating knife remains substantially vertically aligned with the carcass supporting module during the cutting sequence. A size sensor is provided for adjusting the relative position of the reciprocating knife with the module to compensate for changes in bird size. A pair of interconnected actuators provide a three step adjustment for the reciprocating knife. An intermediate conveyor is provided for receiving the severed keel and transferring it to a primary conveyor. Movement in the conveyors are synchronized so that the keel is discharged into a conveyor bin on the primary conveyor that contains the other severed parts of the carcass so that all parts are reunited for further processing or packaging.

2 Claims, 9 Drawing Figures

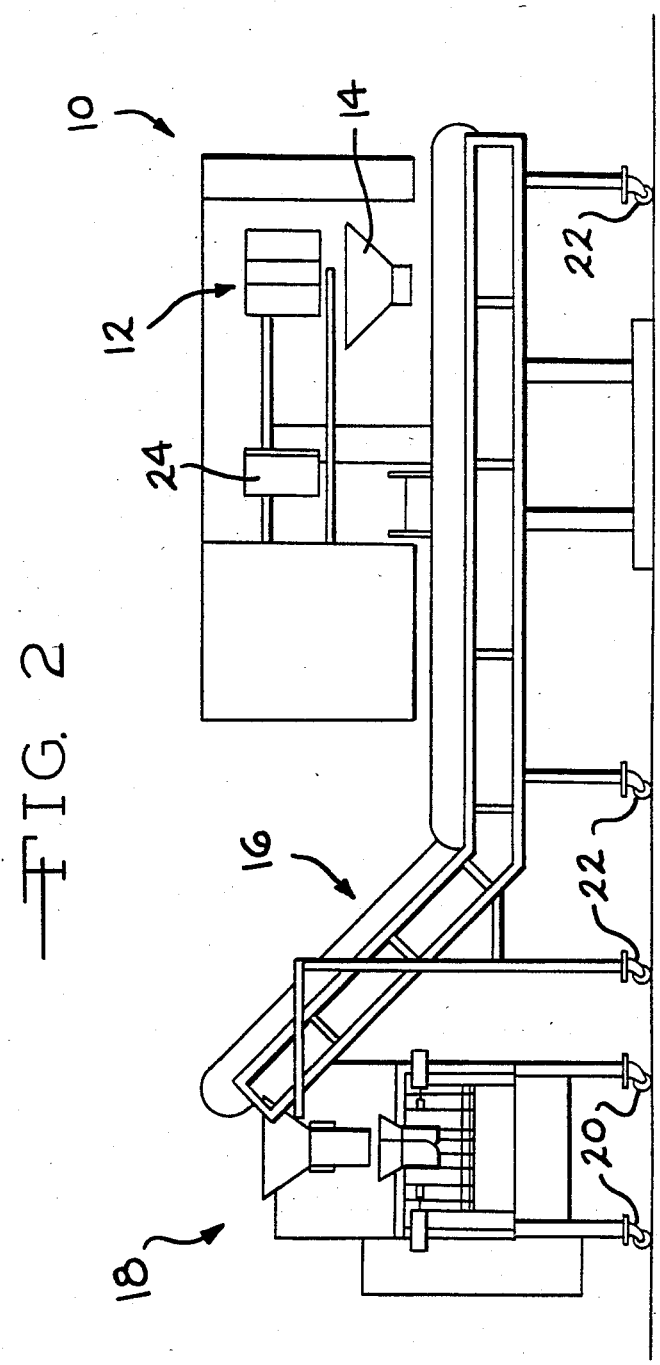

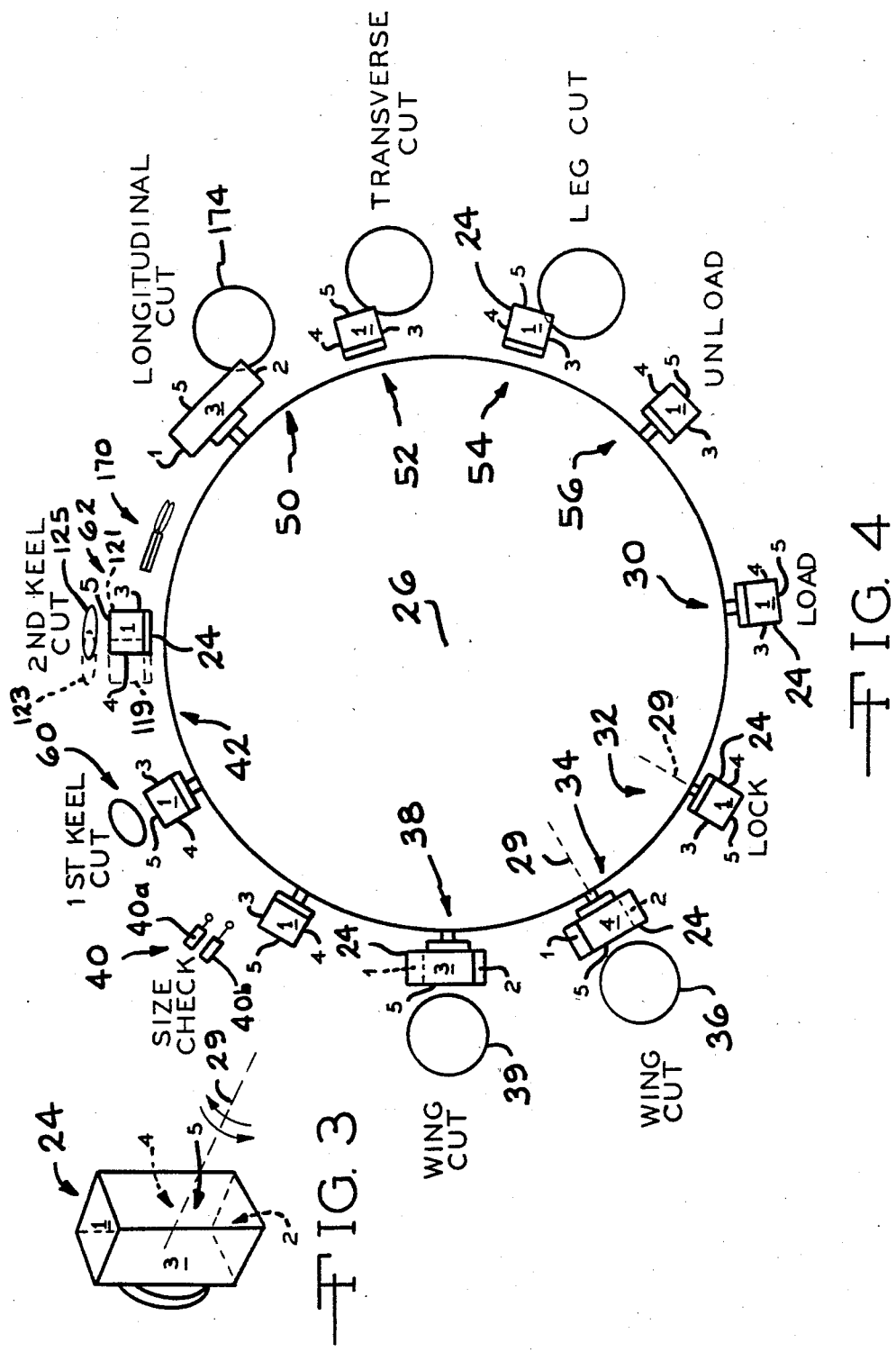

APPARATUS AND METHOD FOR CUTTING SLAUGHTERED POULTRY INTO SEPARATE PIECES

DESCRIPTION

1. Technical Field

The present invention relates generally to automated meat cutting and in particular to an apparatus and method for cutting slaughter poultry into individual pieces.

2. Background Art

Slaughtered poultry is cut or divided into individual pieces by both manual and automated cutting methods. When the birds are cut manually, an expert using an rotary knife makes the necessary cuts. Since skill is required, manually cutting the bird can be expensive and time consuming.

Attempts have been made to automate the cutting process. U.S. Pat. No. 4,406,037, which is hereby incorporated by reference, illustrates an example of an apparatus for automatically cutting a bird into individual pieces. The apparatus includes a frame bird supporting device to which the bird to be cut is clamped and stretched. The frame support forms part of a rotatable turret that carries a plurality of these bird support devices. The turret carries the supports through a plurality of cutting stations that include stationary cutters. The supports are rotatable in a vertical plane so that the orientation of the bird relative to the cutter can be adjusted to effect a predetermined cut. After passing through all the stations, the severed pieces of the bird are discharged into a receptacle or onto a conveyor for further processing or packaging.

The fast food industry has generated a high demand for chickens cut into individual pieces. A given fast food chain will normally specify a rather narrow range of bird sizes that they will accept. Usually the bird size is specified by weight. By only accepting a narrow range of bird weights, the individual pieces are expected to be substantially equal in size and/or weight. It should be apparent that, in order to produce consistently sized individual bird parts, the cutting must be precisely controlled.

To further complicate matters, certain of the fast food chains cut a chicken into nine individual pieces whereas other chains cut a chicken into eight pieces. When a "nine piece cut" is specified, a front breast section of the chicken is severed prior to cutting the bird longitudinally into two halves. This front breast section, termed a "keel", is considered the most valuable piece of the bird and can command two or three times the price of the other chicken parts. For this reason, this section must be very precisely cut in order to maximize its weight without causing undesirable portions of the breast to be included.

The fast food chains that require the "nine piece cut" have placed rather stringent size and weight requirements on the "keel". As a consequence, chickens destined for the fast food market are often cut manually in order to comply with the rigid specification whereas chickens earmarked for the general consumer are cut on automated cutting equipment. It should be apparent that manually cutting chickens is labor intensive and can increase the overall processing costs significantly.

DISCLOSURE OF INVENTION

The present invention provides a new and improved apparatus and method for automatically cutting slaughtered poultry into individual pieces. In particular, the present invention provides a system and cutting method for automatically cutting slaughtered birds such as chickens into either eight or nine pieces. Birds processed using the present invention meet current specifications issued by the fast food industry.

The poultry cutting system includes a rotating, turret-like assembly that carries one or more bird support modules. The bird to be cut is placed on the module at a loading station. In the exemplary embodiment, the turret assembly continuously rotates and the bird support modules are loaded while in motion. Each module is operative to clamp and stretch the bird in preparation for the cutting operation. The parts of the bird are severed at cutting stations spaced about or around the turret assembly and located in the circular path of the support modules. In order to achieve the various cuts, the module itself is rotatable, in a vertical plane, about an axis that is oriented radially with respect to the turret assembly. A camming mechanism forming part of the apparatus is operative to unlock, rotate and relock the position of the module in order to orient a certain portion of the bird to be cut in alignment with a knife at a cutting station. A complete and detailed description of a bird support module and camming mechanism can be found in U.S. Pat. No. 4,406,437 which, as indicated above, is hereby incorporated by reference.

According to the disclosed cutting method, the bird support module carries the bird through various cutting stations, each of which include one or more knives positioned to sever a selected portion of the bird as it is carried past the knife by the support module.

When the bird is to be cut into nine pieces, one of the cutting stations severs a center section of the breast "or keel". In accordance with the invention, the keel cutting process is conducted in two steps by preferably two knives that operate to effect two individual but intersecting cuts, that commence from opposite ends of the keel. The first cutting device, makes a cut at a predetermined angle commencing at the rear of the keel and extending towards the front end of the bird. The second cutting device makes a cut that commences at the front of the keel and continues at a predetermined angle towards the rear of the bird, intersecting the first cut thereby severing the keel from the bird.

In the preferred embodiment, the first cut is achieved by a stationary cutter having a rotating knife. The cutter is oriented so that the knife is positioned at a predetermined angle in the path of module. As the bird is carried (by the module) past the rotating knife, the first cut is made.

The bird is then carried past a second knife. Unlike the first knife however, the second knife is part of a reciprocally movable cutter. The cutter, which also includes a rotating knife, is normally maintained in a parked position at which the cutting knife is spaced from the path of the bird. When the bird support module reaches a predetermined position with respect to the second cutter, the cutter is actuated to drive the knife towards and away from the chicken in order to effect the second cut to completely sever the keel from the rest of the bird.

Since in the preferred embodiment, the turret assembly continues to rotate throughout the cutting operations, in the illustrated embodiment, the second cutter is moved towards and away from the bird along an arcuate path. With the disclosed arrangement, the movement of the cutter is coordinated with the movement of the turret assembly, so that the path of movement of the knife is approximately rectilinear with respect to the moving module. In other words, the center of the rotating knife is approximately fixed with respect to the center line of the bird being cut.

The disclosed keel cutting apparatus and method has been found to provide an extremely accurate and consistent cut. It is believed birds cut with this method, will meet all current cutting specifications now promulgated in the fast food industry.

According to a feature of the invention, the cutting system includes a size sensor for determining the size of the bird to be cut. Since the bird is normally positioned on the module with the keel extending outwardly, variations in bird sizes will change the space relationship between the keel and keel cutting knives. In the preferred and illustrated embodiment the first cutter is positioned so that the cutting knife extends into the path of the moving module sufficiently to cut even the smallest expected bird.

The second cutter is movable to accommodate variations in bird size. In the preferred arrangement, the rotating knife is mounted to a spindle which is slidably held by a spindle housing. An actuating system controlled by a sensor adjusts the position of the spindle within the spindle housing thus changing the position of the rotating knife in the bird processing path. In the preferred and illustrated embodiment, the knife is moved between three discrete positions: an inner position, an outer position, and an intermediate position. According to this feature, movement in the spindle is achieved through an actuator assembly that includes a pair of actuators coupled together. When both actuators are de-energized, the rotating knife is located at the innermost position. When both actuators are energized the rotating knife is positioned to the outermost position and when one of the actuators is energized and the other de-energized, the knife is located at the intermediate position.

To achieve synchronization of the cutter with the rotating turret, the turret drive motor and the cutter actuation motor are synchronized so that changes in rotational speed of either motor cause the speed of the other motor to change appropriately so that the motion of the cutter remains coordinated with the movement of the bird through the cutting station.

According to another feature of the invention, the second cutter is oriented so that the rotational axis of the rotating knife is directed radially with respect to the rotational axis of the turret assembly. In addition, the pivotal axis about which the cutter is reciprocated, is preferably in the range of 16° with respect to a rotational plane of the turret assembly. In the preferred system, the bird is held vertically with the legs uppermost, as it passes through the keel cutting station.

According to another feature of the invention, the bird is severed in halves at a cutting station that includes a rotating knife positioned such that its rotational plane is parallel to the rotational plane of the turret assembly. The module and hence the bird is rotated so that the head end of the bird is forwardly and enters the cutting station first. It has been found that effecting the longitudinal cut from the head end to the tail of the bird provides a more uniform and reliable cut.

According to still another feature of the invention, tension in the breast area of the bird is released prior to effecting the keel cut. In the preferred embodiment, this is achieved by severing the wings prior to entering a keel cutting station. Alternately, the clamping members used to clamp the wings to the module can be released to relieve the tension should it be desirable to cut the wings after the keel cutting step.

After the bird has passed through the various cutting stations, the module ultimately arrives at an unloading station at which the severed parts are released from the module and drop to a receptacle. In the preferred and illustrated embodiment, the parts drop onto a conveyor which transports the parts to a remote location for bagging or other operations. As described above, during the keel cutting operation, the keel drops from the bird and is thus separated from the rest of the pieces. In accordance with the invention, the keel drops onto an intermediate conveyor which is coordinated with the main conveyor. With the present invention, the intermediate conveyor transports the keel to the main conveyor and is synchronized such that the keel is reunited with the other parts of the bird so that all nine pieces can be packaged together.

Additional features of the invention will become apparent and a fuller understanding obtained by reading the following detailed description made in connection with the accompanying drawings.

BRIEF DESCRIPTION OF THE DRAWINGS

FIG. 2 is a side elevational view of the system shown in FIG. 1;

FIGS. 3 and 4 illustrate schematically a method for processing slaughtered poultry in accordance with the present invention;

Best Mode for Carrying Out the Invention

Figure 1:
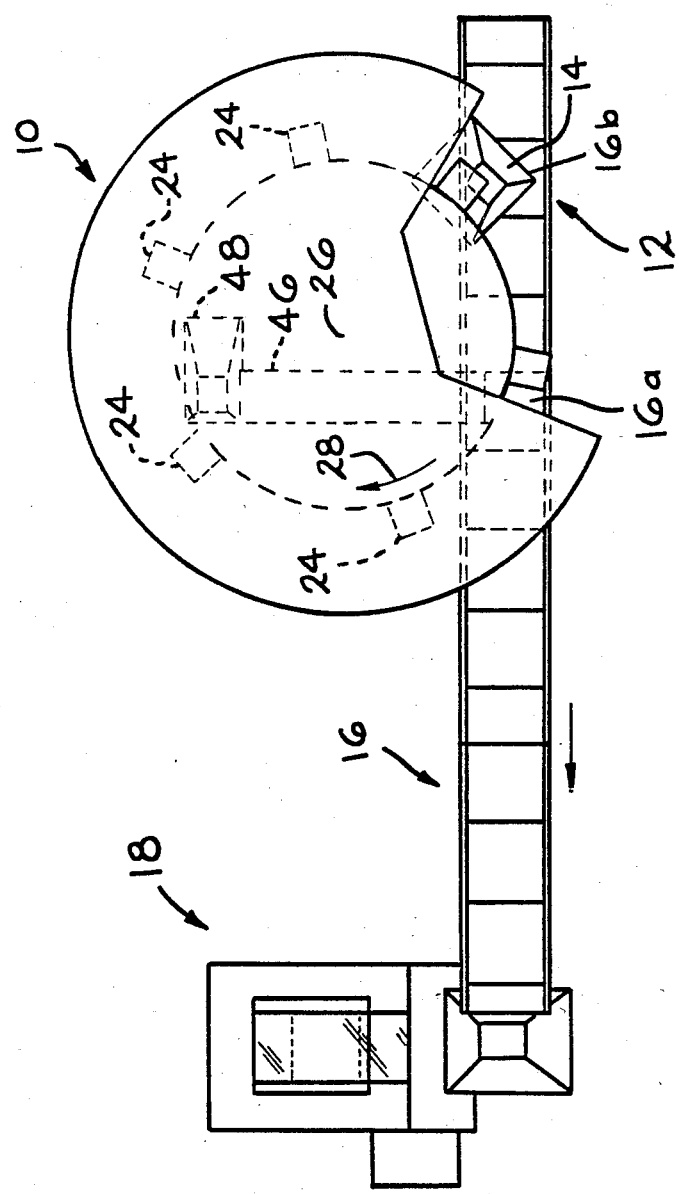
FIG. 1 is a plan view which illustrates, somewhat schematically, a poultry harvesting system including a bird cutting apparatus, a packaging apparatus and a conveyor for conveying processed birds to the packaging machine.

FIGS. 1 and 2 illustrate the overall construction of a poultry harvesting system embodying the present invention. The system includes a poultry cutting machine 10 for automatically cutting a bird into separate pieces. The cut pieces are discharged at an unloading station, indicated by the reference character 12, that includes a funnel shaped structure 14, for guiding the parts onto a primary conveyor 16. The poultry parts are then conveyed to a packaging apparatus indicated generally by the reference character 18. An example of a packaging apparatus is disclosed in copending application Ser. No. 688,696, filed concurrently herewith entitled Packaging Apparatus and Method, which is hereby incorporated by reference. As seen best in FIG. 2, the system is modular and the individual units are movable (via casters 20, 22) to facilitate maintenance and cleaning of the various components.

The poultry cutting machine 10 is circular in construction and includes one or more bird holding modules 24 to which a slaughtered bird is secured and stretched for processing through the machine 10. An example of such a holding and stretching device is shown in U.S. Pat. No. 4,406,037, which is hereby incorporated by reference.

To facilitate the explanation of the present invention, the holding module 24 is illustrated schematically in FIGS. 3 and 4. As explained in the above referenced patent, the modules are rotatably supported by radial arms forming part of the poultry cutting machine 10. In effect, the machine comprises a turret like assembly, preferably including a plurality of radial arms each supporting one of the modules 24. In the illustrated machine 10, the turret rotates about an axis 26, in the clockwise direction indicated by the direction arrow 28 in FIG. 1. A camming mechanism rotates the modules to predetermined orientations so that certain chicken parts are aligned with a cutting mechanism located along the path of movement of the module. As seen in FIG. 3, each module 24 is rotatable in either the clockwise or counterclockwise direction, about a transverse axis 29. The cutting sequence is illustrated schematically in FIG. 4. FIG. 3 schematically illustrates the general orientation of the bird holding module 24 and in the preferred embodiment, the bird is mounted upside down until its back bone is held against the face labeled "5" and with the breast extending outwardly from the module.

In particular, the bird to be processed is mounted or hung onto a module at a loading station 30, by an operator. After loading, the module 24 is located in a vertical orientation with the side labeled "1" uppermost. The module is then conveyed to a locking position 32 at which a stretching and clamping mechanism forming part of the module is operated to stretch and clamp the bird to the module.

The module then travels to a first wing cutting station 34. Prior to arriving at the station 34 the module is rotated about the axis 29 to align a wing joint with a knife 36. Preferably, the knife 36 is formed by a rotating blade driven by a suitable motor. In the illustrated apparatus, the module is angularly positioned so that the wing joint is parallel and aligned with a plane of rotation of the knife 36. The module then travels to a second wing cutting station 38. Prior to arriving at the station, the module 24 is again rotated to align the other wing joint with a second rotating knife 39.

In accordance with the preferred method and apparatus, a front breast section or "keel" is severed from the bird at the next cutting station, when the bird is to be cut into nine pieces. When the "nine piece cut" is being employed, the module travels through a size monitoring station 40 which determines the size of the bird and adjusts knives at the keel cutting station, indicated generally by the reference character 42. The operation of the keel cutting mechanism will be described in detail below. The severed keel drops from the bird at the keel cutting station 42 onto an intermediate conveyor 46, shown best in FIG. 1. A funnel 48 at the keel cutting station directs the keel onto the conveyor. The intermediate conveyor 46 conveys the keel to the primary conveyor 16.

In accordance with the invention, the speed or indexing of the intermediate conveyor 46 is synchronized with the primary conveyor so that the keel is dropped into a bin 16a of the primary conveyor where the other parts of a given bird are located. With this arrangement, all the parts of a bird are packaged together.

Returning to FIG. 4, after leaving the keel cutting station, the bird support module rotates transversely to point the front of the bird towards the direction of travel. The module then enters a longitudinal cutting station, indicated by the reference character 50, where the bird is cut in half. In the preferred method, the cut commences at the front of the bird and proceeds towards the rear. It has been found, that with this cutting sequence, a more uniform and accurate cut can be made. Since the backbone is thicker at the front of the bird, it is believed that once the cutter enters and begins cutting the backbone longitudinally, the backbone itself acts to steer or maintain alignment of the bird with the blade.

After leaving the station 50, the holding module 24 then travels to a transverse cutting station 52 where the legs are severed from the rest of the bird. In order to achieve this cut, the module 24 is preferably rotated so that the legs of the bird are uppermost. The module then travels to a leg cutting station 54 where the lower part of the leg is severed from the thigh. After leaving the leg cutting station 54, the bird cutting sequence is completed and the module travels to an unloading station 56 where the holding module 24 releases the bird parts onto the conveyor 16. The funnel 14 (shown in FIG. 1) directs the parts into a bin 16b. As indicated above, the conveyor transports the bird parts to a bagging machine (indicated generally by the reference character 18 in FIG. 1). As the bin 16b passes the intermediate conveyor 46, the keel of the bird (which was previously severed at the keel cutting station) is reunited with the other parts of the bird so that all nine pieces arrive together at the bagging apparatus.

Figure 5:
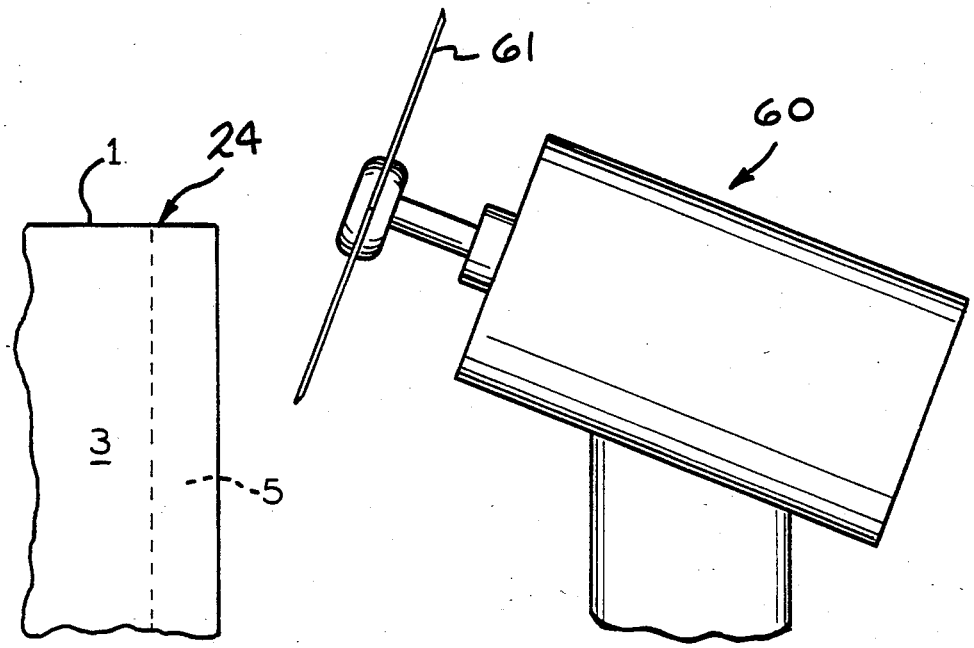

Turning now to FIGS. 5–8, the apparatus for severing the keel at the keel cutting station is illustrated. In accordance with the invention, the apparatus preferably comprises a first cutter 60 (shown in FIG. 5). In the illustrated embodiment, the cutter comprises an electrically driven circular knife 61 disposed at an angle with respect to the bird holding module 24. As indicated in FIG. 4, prior to passing the cutter 60, the module 24 is oriented so that the legs of the bird are uppermost. As the module 24 passes the cutter 60, the knife 61 severs a portion of the keel from the rest of the bird as the bird is carried by the rotating knife. In the preferred method, the rotating knife is positioned at an angle (as shown in FIG. 5) with respect to the module and is adjusted such that the cut is made into a fleshy part of the bird and does not cut the sternum or other bone structure of the bird.

Figure 6:
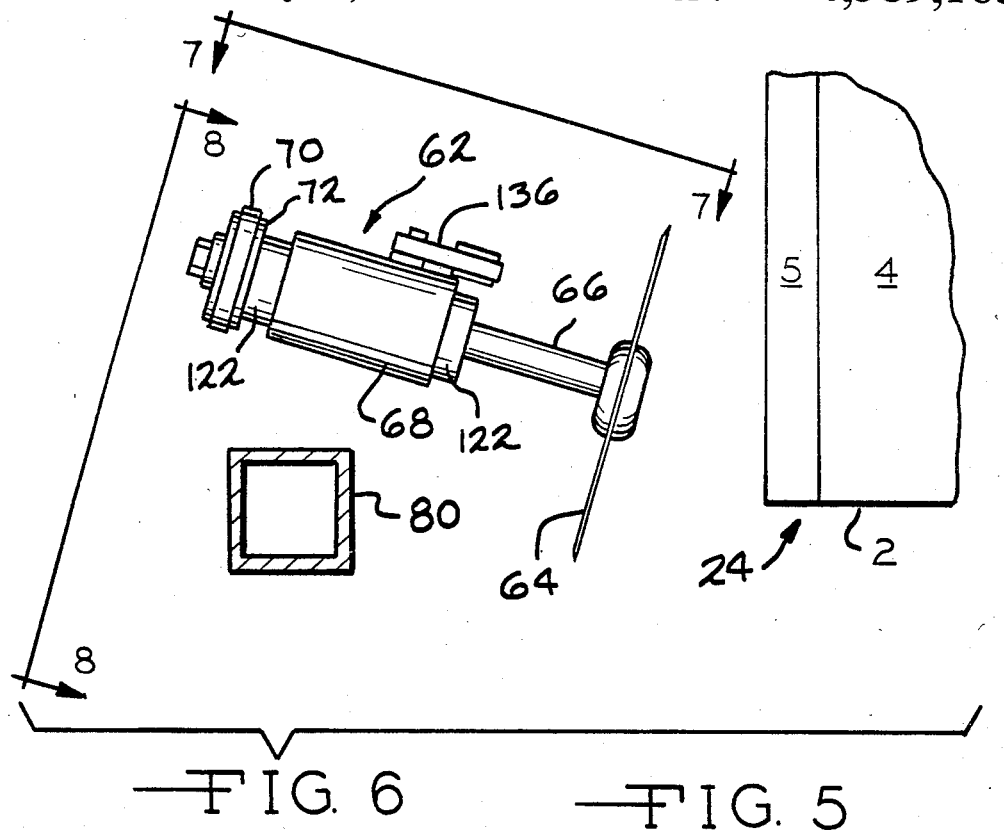
FIGS. 5 and 6 are side views, shown schematically, of a first and second cutter, respectively, used in severing a front breast section of a bird, constructed in accordance with the preferred embodiment of the invention.
Figure 7:
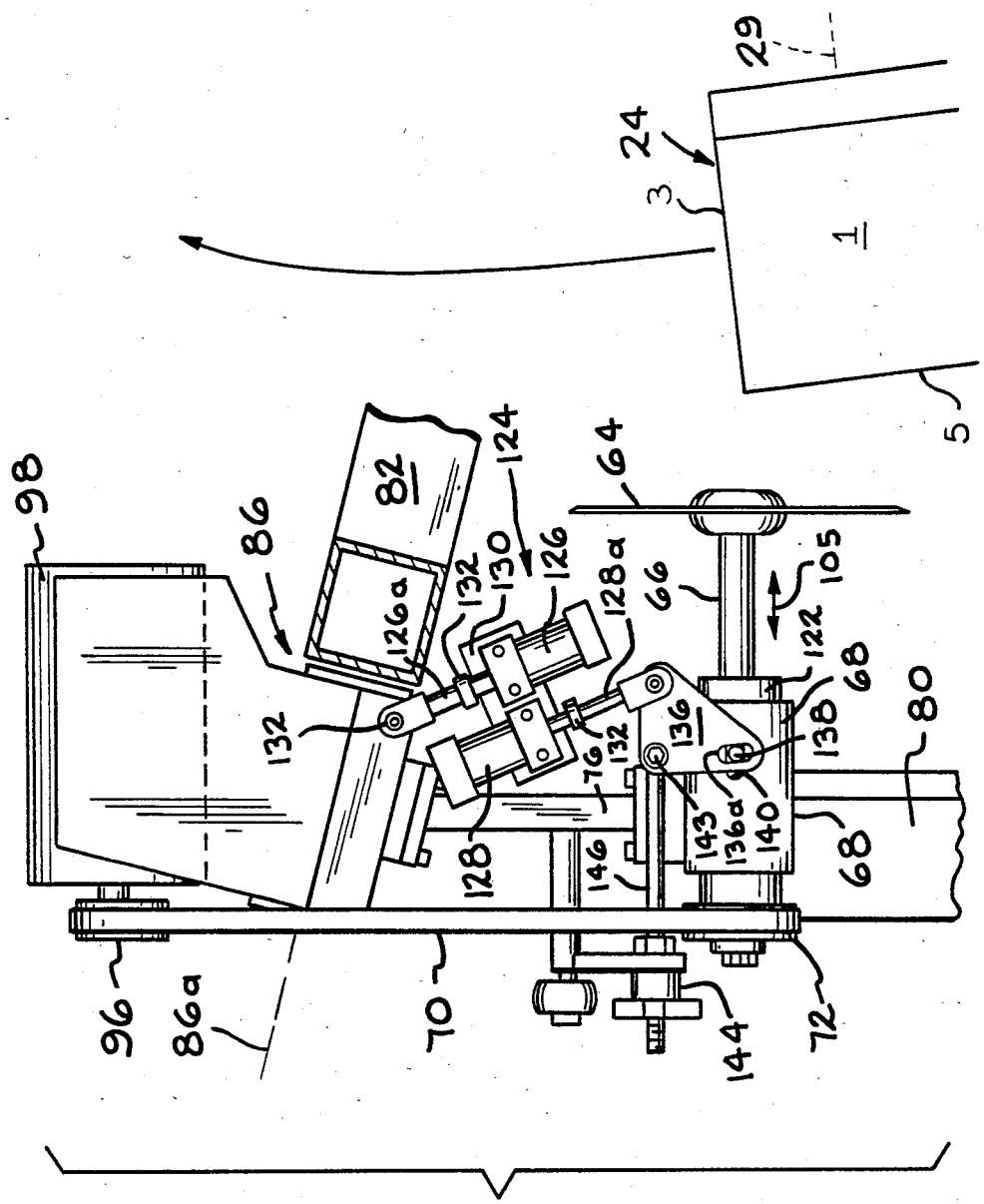
FIG. 7 is a plan view as seen from the plane indicated by the line 7—7 in FIG. 6.
Figure 8:
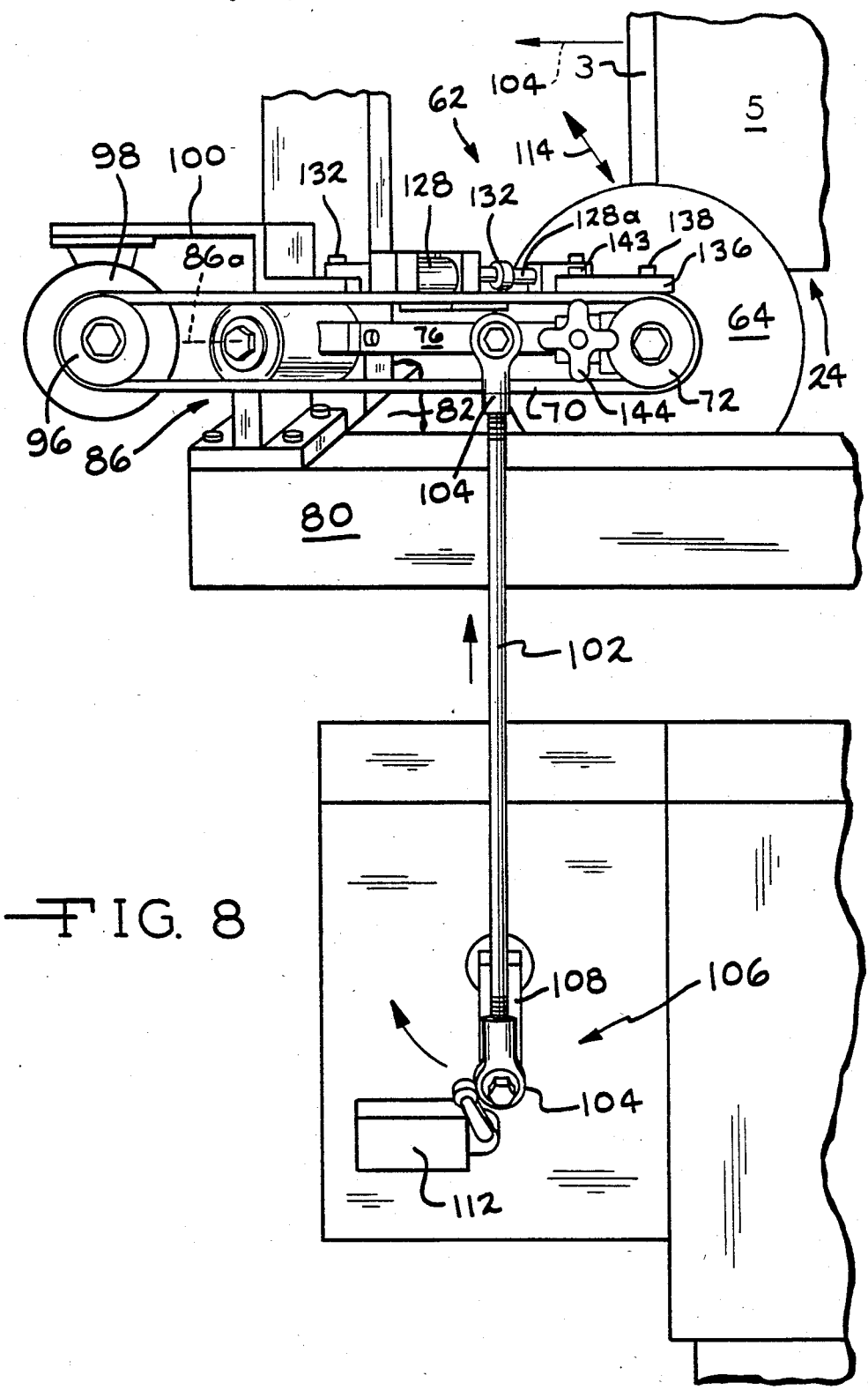
FIG. 8 is a side elevational view as seen from the plane indicated by the line 8—8 in FIG. 6.

Turning now to FIGS. 6–8, a second cut is made by a reciprocating cutter 62 which in the preferred and illustrated embodiment includes a rotating knife 64. As seen best in FIGS. 6 and 7, the rotating knife 64 is attached to a spindle 66 rotatably supported by a bearing housing 68 and driven by a drive belt 70 reeved around a driven pulley 72 mounted at the opposite end of the spindle. The bearing housin9 68 is supported by an arm 76 which in turn is pivotally attached to a perimeter frame member 80 forming part of the cutting machine. As seen best in FIGS. 7 and 8, the cutting machine includes a radially disposed support frame member 82 which joins the perimeter frame member 80.

A pivot assembly 86 pivotally supports the arm 76. As seen best in FIG. 7, the pivot axis 86a of the pivot assembly 86 is located in a vertical plane that is parallel to a longitudinal centerline of the radial frame member 82 and thus the axis 86a is directed radially with respect to the turret assembly. However, as seen in FIG. 8, the axis 86a of the pivot is tilted downwardly and defines an acute angle with respect to a rotational plane defined by the turret assembly. As seen best in FIG. 6, with the disclosed arrangement, the rotating knife 64 is tilted at a similar angle with respect to the module 24 and defines an angular path of movement for the rotating knife towards and away from the module 24 so that an inwardly directed cut is made on the bird whenever the bearing housing 68 moves upwardly (as viewed in FIG. 6) about the pivot 86. It has been found that a pivot axis 86a oriented at an angle of substantially 16° with respect to the horizontal frame members provides a desired cutting angle.

Driving the rotating knife 64 can be accomplished by a variety of mechanisms. In the disclosed embodiment, the drive belt 70 extends between the driven pulley 72 and a drive pulley 96 forming part of a drive motor 98. In the illustrated embodiment, the drive motor is attached to a support arm 100 which in turn is attached to the pivot assembly 86. As a result, the drive motor is reciprocated with the cutter. Alternate arrangements can be utilized which could include a motor mounted to the frame structure, which would not reciprocate with the cutter mechanism.

The mechanism for reciprocating the cutter assembly 62 towards and away from the bird is best shown in FIG. 8. A connecting rod 102 extends from the cutter support arm 76 down to a crank mechanism indicated generally by the reference character 106. Preferably the ends of the connecting rod mount spherical bearing assemblies 104 so that angular movement of the cutter assembly 62 can be accommodated. The spherical bearing assemblies are threadedly received by the connecting rod 102 and provide a length adjustment. In the preferred embodiment, the connecting rod 102 is driven by a one revolution clutch mechanism (not shown) which drives a crank 108. Various clutch/brake mechanisms are available that can be used to effect the synchronized reciprocation of the cutter assembly 62. In the apparatus shown, a switch 112 is used to sense the position of the crank 108 and provide for a single crank revolution. When the clutch (not shown) is energized, the crank 108 begins rotating, disengages the switch 112 and drives the connecting rod 102 upwardly. As the crank 108 returns to its start position, the switch 112 is reclosed, indicating the completion of a cutting cycle. The reclosure of the switch 112 in connection with control circuitry (not shown) deenergizes the drive clutch and energizes the brake to arrest further motion in the crank 108.

The switch forms part of a control system which causes one revolution of the crank whenever a cutting cycle is desired. As seen best in FIG. 8, the single revolution of the crank produces reciprocating pivotal motion in the rotating knife 64 along a path indicated by the arrow 114. The limits of the arc through which the rotating knife is driven are determined at least in part by the crank arm 108. The plane of reciprocating motion for the rotating knife 64 is determined by the orientation of the pivot 86a axis as well as the relative angle defined between the pivot axis and the rotational axis of the knife (which is a function of the support arm 76). In the preferred embodiment, the cutter support arm 76 mounts the cutter 62 such that viewed in plan (as shown in FIG. 7), the axis of rotation for the blade 64 is parallel to a radial line of the turret assembly.

As indicated previously, in the preferred embodiment, the bird holding modules 24 are moved continuously, through the cutting stations by the turret assembly. Each module 24 moves transversely, as indicated by the reference character 104 in FIG. 8, relative to the stationary keel cutter 60 shown in FIG. 5. According to the invention, the operating mechanism for the reciprocating cutter 62 is arranged to move the rotating knife 64 along a path such that its motion is synchronized with the moving module 24. The preferred movement is illustrated schematically in FIG. 4. In particular, the pivot axis of the support arm 76 and the actuation speed of the crank 108 are adjusted so that the transverse component of the angular motion of the cutter 62 is substantially equal to the speed of the module 24 so that the rotating knife remains vertically aligned with the module and relative movement between the module and the knife occurs substantially only in a vertical direction.

As seen in FIG. 4, as the module 24 passes by the second keel cutter 62, during the cutting sequence, it moves between a position 119 (indicated in phantom) and a position 121 (indicated in solid). As the module travels between these two positions, the cutter 62 is reciprocated to displace the associated knife 64 between a position 123 (indicated in phanton) and a position 125 (indicated in solid). As seen in FIG. 4, the transverse component of movement in the knife 64 corresponds to the displacement of the module 24 so that, as viewed in plan, the axis of the knife 64 remains substantially aligned with the module 24. With the disclosed apparatus, the cut made by the keel cutting mechanism 62 approximates the kind of cut that would occur if the module were stationary and a rotating knife were moved towards and away from the bird along a rectilinear path. In order to maintain synchronization, the drive motors for both the module turret assembly and the crank mechanism are synchronized by a suitable control circuit, known in the art, so that speed changes in one of the motors causes a proportional speed change in the other.

As seen in FIG. 8, the drive motor for the rotating knife is mounted to the motor support arm 100 which extends to the left of the pivot assembly 86. With this arrangement, the motor also moves when the cutter 62 is actuated. Other mounting arrangements are also contemplated in which the motor would be stationary and a suitable drive connection made to the pivotally mounted cutter assembly.

Turning now to FIG. 7, the rotating knife 64 is movable towards and away from the module 24, along its axis of rotation to compensate for variations in bird size as indicated by the arrow 105. As indicated above, the spindle 66 to which the knife 64 is mounted is rotatably held by the bearing housing 68. The spindle itself is supported by bearings 122 which are slidably mounted in the bearing housing 68. An actuator mechanism indicated generally by the reference character 124 is operative to extend and retract the bearings 122 with respect to the bearing housing 68.

In particular, the mechanism 124 includes a pair of fluid pressure operated actuators 126, 128 coupled together by a coupling 130. The actuators include respective actuating rods 126a, 128a. Each rod mounts a stop 132 which limits the retraction of its associated actuating rod. The actuating rod 126a of the actuator 126 is pivotally connected to the motor support arm 100 at a pivot 132. The actuating rod 128a of the actuator 128 is pivotally connected to a triangular linkage member 136 which includes a slot 136a adapted to receive a pin 138 that is connected to the bearing assembly 122. The pin 138 extends through a slot 140 formed in the bearing housing and thus prevents rotation of the bearing assembly 122. The linkage member 136 is pivotally connected to the cutter support arm 76. In particular, a pivot 143 is adjustable and includes an adjustment knob 144 which via a linking rod 146 provides for moving the pivot towards and away from the plane of the rotating knife 64. It should be apparent that for fixed positions of the actuator rods 126a, 128a, movement of the pivot 143 via the adjustment will cause positional changes in the bearing assembly 122 and hence the position of the rotating knife relative to the holding module 24. The purpose of the adjustment is to initially preset the position of the rotating knife 64.

The disclosed actuator arrangement provides for three discrete positions for the rotating knife relative to the module. As indicated above, prior to entering the keel cutting station, the holding module 24 carries the bird through the size monitoring station 40. Referring also to FIG. 4, in the disclosed embodiment, the monitoring station includes a pair of sensors 40a, 40b which, for example, may comprise switches selectively actuatable by a bird as it is carried through the sensing station 40. With the disclosed sensing system, three discrete bird sizes can be sensed. It must be understood that the present invention also contemplates a continuous sensor of the type that would sense any size bird which in accordance with a suitable control system, would adjust the position of the rotating knife 64 to compensate for even small variations in bird sizes. It has been found, however, that an adjusting mechanism that positions the knife 64 at one of three positions can provide satisfactory results for most applications.

The disclosed sensing and knife adjusting system operates as follows. If both switches 40a, 40b are activated by the bird as it passes through the size monitoring station 40, the actuating rods 126a, 128a are both extended to in effect increase the overall length of the linkage arm formed by the two cylinders. In other words, when the actuating rods extend, the triangular link 136 is rotated clockwise (as viewed in FIG. 7) and drives the bearing assembly 128 leftwardly thus increasing the distance between the rotating blade 64 and the holding module 24. When both switches 40a, 40b are actuated it indicates that the module is carrying a large sized bird and the breast section to be severed extends outwardly a greater distance from the module.

If neither of the switches 40a, 40b are actuated, indicating the presence of a small bird, both actuating rods 126a, 128a are retracted thus decreasing the distance between the stationary pivot 132 on the arm 100 and the coupling link 136. Retraction of the actuating rods 126a, 128a causes counterclockwise rotation of the coupling link 136 and drives the bearing assembly 122 rightwardly thus positioning the rotating knife 64 closer to the module 24.

If only the switch 40a is actuated, indicating the presence of an intermediate sized bird, one of the actuating rods 126a, 128a is extended while the other of the actuating rods is retracted thus defining an intermediate length between the stationary pivot 132 and the coupling link 136. This positions the knife 64 at an intermediate position relative to the module 24.

For many if not most bird cutting applications, the birds are grouped by size prior to processing. The birds of a given group often vary in weight by only a few ounces and hence the size variation between the birds of a group can be easily accommodated by the three position knife actuating system. In practice, the initial position of the knife 64 is adjusted by the manual control 144. For example, with both actuators extended as shown in FIG. 7, the manual adjustment 144 would be manipulated to move the knife 64 to the position it should assume to provide a proper cut on the largest expected bird size. The intermediate and forwardmost positions can then also be adjusted for the range of bird sizes expected, by adjusting the positions of the stops on the extension rods 126a, 128a.

The keel cutting apparatus disclosed above has been found to provide extremely accurate and consistent cuts and meets the rather stringent specifications for cutting chicken parts for the fast food industry.

It has been found that cutting the wings prior to cutting the keel improves the consistency of the keel cutting step. It is believed that severing the wings from the bird reduces tensions in the breast area of the bird, thus improving the severance of the keel. As indicated above, the wings are clamped to the module 24. As an alternative to cutting the wings prior to the keel cutting station, the wing clamping mechanism can be relaxed during the keel cutting operation in order to improve the consistency with which the cut is made, should severing of the wings after the keel cutting operation be desired.

It is also believed that the consistency with which the keel sections of the bird can be severed is achieved due to the method of actuating the second cutter 62. Although in the preferred embodiment, the cutter is pivotally mounted and synchronized with the moving module 24, alternative arrangements are contemplated in which the rotating knife would be reciprocated along a rectilinear path relative to the module 24 towards and away from the lower front section of the bird.

Returning to FIG. 1, as described above, in the preferred embodiment, the keel is severed at a keel cutting station 42 and drops onto an intermediate conveyor 46 which conveyors the severed keel to the primary conveyor 16 and reunites it with the other severed poultry parts. The conveyor 16 moves leftwardly, as viewed in FIG. 1, and as indicated by the arrow 160 to transfer the parts to a bagging apparatus 18. With the preferred arrangement, the wings are severed prior to the keel cutting operation.

An alternate cutting sequence is also contemplated that could eliminate the need for the intermediate conveyor 46. In the alternate arrangement, the keel cutting station is moved so that it is the first station in the cutting sequence, i.e. the position now occupied by the wing cutting station 34 in FIG. 4. In the alternate arrangement, the conveyor 16 and bagging apparatus 18 will be repositioned so that the conveyor 16 moves rightwardly as viewed in FIG. 1 and the bagger 18 is positioned to the right of the cutting machine 10. With this alternate arrangement, the keel would be severed at the first cutting station and drop directly onto the primary conveyor 16. The motion in the conveyor 16 would then be synchronized so that as the keel moves rightwardly in a conveyor bin 16a it would arrive at the unloading station 14 as the other severed poultry parts were discharged thereby reuniting the keel with the rest of the carcass. As indicated above, in order to provide consistent keel cutting, the wings would have to be relaxed during the keel cutting operation to relieve tensions in the breast area to provide an accurate cut.

Figure 9:
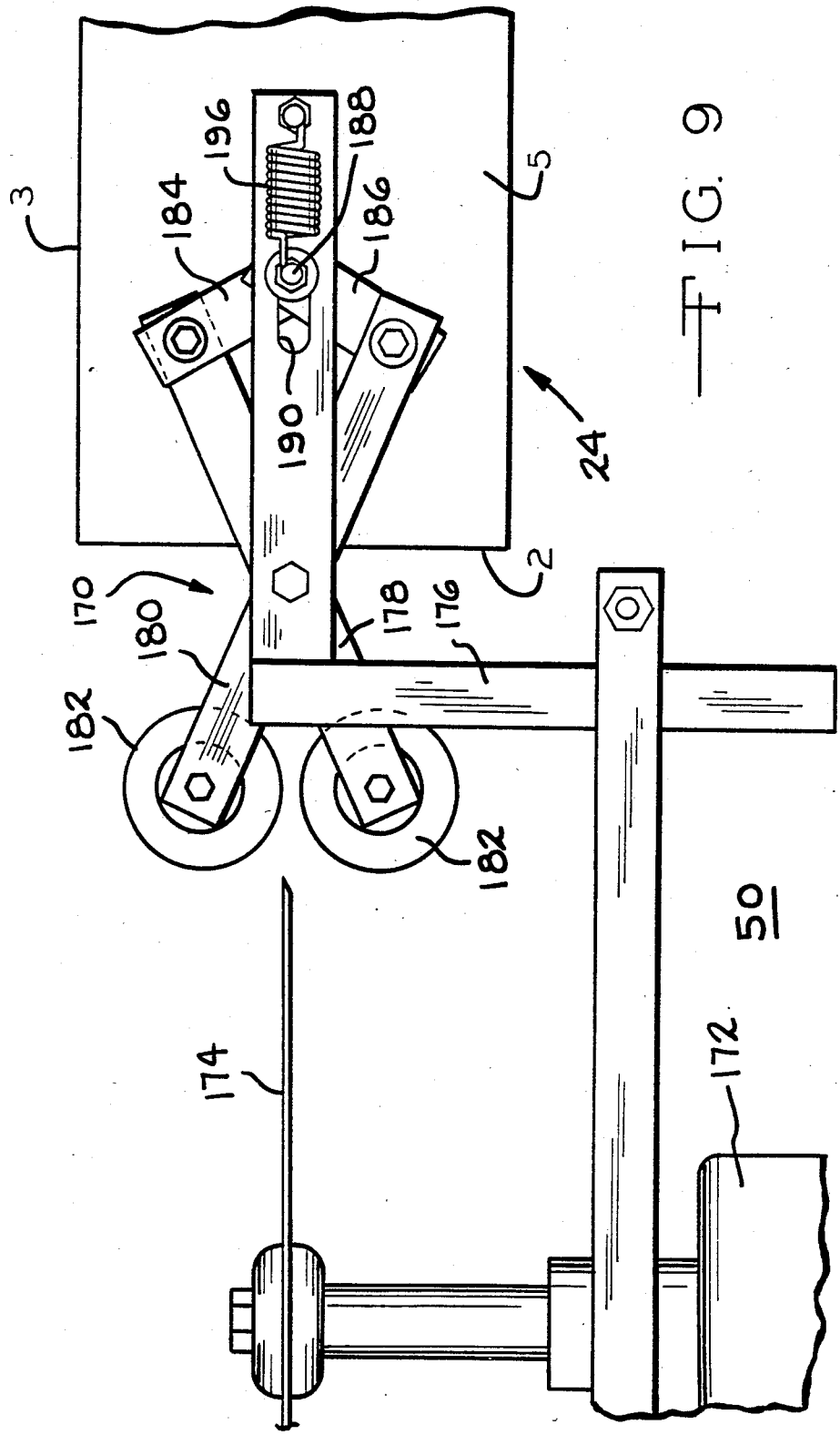
FIG. 9 is a side elevational view of an alignment mechanism used in making a longitudinal cut to separate the bird into two halves.

Turning now to FIG. 9, a guiding apparatus 170 is illustrated for supporting a carcass during a longitudinal cutting sequence when the carcass is to be cut into eight individual pieces. In a "eight piece cut" the keel is not severed from the carcass. Instead, after the wing cutting step at station 38 (see FIG. 4) the carcass is split longitudinally at the cutting station 50. The guiding apparatus 70 supports and guides the carcass during the splitting operation.

As seen in FIG. 9, the cutting station 50 includes a stationary cutter 172 including a transversely positioned rotating knife 174. The guide 170 is positioned in alignment with the knife 174, immediately upstream of the cutting station. The guide comprises a support member 176 that mounts a pair of arms 178, 180. The arms 178, 180 are pivotally connected and each arm mounts an associated guide wheel 182. The opposite ends of each arm 178, 180 are joined to respective links 184, 186. The links 184, 186 are pivotally connected together by a pin 188 that extends through a slot 190 formed in the support member. The pin in turn is connected to a tension spring 196 which pulls the links rightwardly (as viewed in FIG. 9) and thus urges the guide wheels 182 towards each other. The guide mechanism 170 is positioned so that as the carcass is carried by the module 24 past the guide, the rollers 182 engage and guide the breast bone of the carcass to maintain alignment of the carcass with the rotating knife 174. With the disclosed mechanism, accurate, longitudinal cuts can be achieved.

Although the invention has been described with a certain degree of particularity, it should be understood that various changes can be made to it by those skilled in the art without departing from the spirit or scope of the invention as hereinafter claimed.

We claim:

1. An adjustable knife for use in a bird carcass cutting system, comprising:
    (a) a circular knife mounted to a rotatable spindle;
    (b) a bearing means rotatably supporting said spindle;
    (c) a bearing housing slidably supporting said bearing means;
    (d) a pair of interconnected, fluid pressure operated actuators, each actuator including an associated actuator rod;
    (e) the actuating rod of one of said actuators coupled to said bearing means, the actuating rod of the other of said actuators connected to a remote pivot, such that said actuators and actuating rods define a linkage arm between said remote pivot and said bearing means, and
    (f) means for selectively actuating said actuators to extend and retract the actuating rods of said actuators whereby the length of said linkage arm defined by said actuators is changed in discrete steps thereby to move said bearing means relative to said bearing housing.

2. The apparatus of claim 1 further including an adjustable stop means on at least one of said actuating rods to define the limits of retraction for said rod.

* * * * *